United States Patent
Park et al.

(10) Patent No.: US 7,853,982 B2
(45) Date of Patent: Dec. 14, 2010

(54) METHOD FOR MANAGING APPLICATIONS RELATED TO DATA BROADCASTING, CLASS/INTERFACE STRUCTURE FOR CONTROLLING THE SAME, AND BROADCAST RECEIVER FOR CONTROLLING THE CLASS/INTERFACE STRUCTURE

(75) Inventors: Tae-Jin Park, Gyeonggi-do (KR); Jin Wook Kwon, Seoul (KR); Sang Hoon Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 713 days.

(21) Appl. No.: 11/452,385

(22) Filed: Jun. 14, 2006

(65) Prior Publication Data

US 2007/0180480 A1    Aug. 2, 2007

(30) Foreign Application Priority Data

Feb. 1, 2006    (KR)    ...... 10-2006-0009833

(51) Int. Cl.
H04N 7/173    (2006.01)
H04N 7/16    (2006.01)

(52) U.S. Cl. ......... 725/132; 725/140; 725/152

(58) Field of Classification Search ......... 725/25, 725/78, 88, 102, 140, 152, 132
See application file for complete search history.

(56) References Cited

U.S. PATENT DOCUMENTS

| | | | |
|---|---|---|---|
| 7,219,367 B2 * | 5/2007 | Briggs | 725/139 |
| 7,266,726 B1 * | 9/2007 | Ladd et al. | 714/27 |
| 2002/0124270 A1 * | 9/2002 | Mori et al. | 725/151 |
| 2003/0196189 A1 * | 10/2003 | Wang et al. | 717/124 |
| 2004/0031052 A1 | 2/2004 | Wannamaker et al. | |
| 2005/0002666 A1 * | 1/2005 | Asai et al. | 396/429 |
| 2005/0125357 A1 * | 6/2005 | Saadat et al. | 705/57 |
| 2005/0160045 A1 * | 7/2005 | Watanabe et al. | 705/51 |
| 2005/0204391 A1 * | 9/2005 | Hunleth et al. | 725/78 |
| 2005/0246707 A1 * | 11/2005 | Ismail et al. | 718/100 |
| 2005/0283800 A1 * | 12/2005 | Ellis et al. | 725/40 |
| 2006/0020950 A1 * | 1/2006 | Ladd et al. | 719/328 |

(Continued)

FOREIGN PATENT DOCUMENTS

EP    1526714 A1    4/2005

(Continued)

OTHER PUBLICATIONS

"OpenCable Applicant Platform Specification-OCAP 1.0 Profile OC-SP-OCAP1.0-I06-050803", 2001-2005 Cable Television Laboratories, Inc, whole document.*

(Continued)

Primary Examiner—Son P Huynh
(74) Attorney, Agent, or Firm—McKenna Long & Aldridge LLP (57) ABSTRACT

A method for managing the applications related to data broadcasting, a class/interface structure for controlling the same, and a broadcasting receiver for controlling the class/interface receiver can prevent data broadcast-associated application from conflicting with a Native application. The method comprising the steps of: pausing an application associated with a cable mode if a current input mode is not in cable mode; and controlling a broadcast receiver by using an application that is native to the broadcast receiver.

2 Claims, 6 Drawing Sheets

U.S. PATENT DOCUMENTS

| | | |
|---|---|---|
| 2006/0168054 A1* | 7/2006 | Burkhart et al. ............. 709/206 |
| 2006/0291507 A1* | 12/2006 | Sarosi et al. ................ 370/493 |
| 2007/0030389 A1* | 2/2007 | Lee et al. .................... 348/564 |
| 2008/0209453 A1* | 8/2008 | Wouters ...................... 719/332 |
| 2009/0158374 A1* | 6/2009 | Malaure et al. ............. 725/114 |

FOREIGN PATENT DOCUMENTS

| | | | |
|---|---|---|---|
| WO | WO 00/24192 | * | 4/2000 |
| WO | WO 2005/081895 A2 | | 9/2005 |

OTHER PUBLICATIONS

"OpenCable Applicant Platform Specification-OCAP 1.0 Profile OC-SP-OCAP1.0-I16-030430", 2001-2003 Cable Television Laboratories, Inc, whole document.*

European Search Report dated Jun. 11, 2006.

* cited by examiner

METHOD FOR MANAGING APPLICATIONS RELATED TO DATA BROADCASTING, CLASS/INTERFACE STRUCTURE FOR CONTROLLING THE SAME, AND BROADCAST RECEIVER FOR CONTROLLING THE CLASS/INTERFACE STRUCTURE

This application claims the benefit of Korean Patent Application No. 10-2006-0009833, filed on Feb. 1, 2006, which is hereby incorporated by reference as if fully set forth herein.

BACKGROUND OF THE INVENTION

1. Field of the Invention

The present invention relates to a data broadcasting, and more particularly to a method for managing applications related to the data broadcasting, a class/interface structure for implementing the managing method, and a broadcast receiver for processing the class/interface structure.

2. Discussion of the Related Art

In recent times, many developers have conducted intensive research into a data broadcast service for digital broadcasting.

If the data broadcast service is made commercially available, a user can experience a variety of contents via a TV at home.

Generally, a set-top box capable of receiving data broadcast signals and a broadcast receiver (e.g., a DTV, etc.) equipped with such a set-top box have been designed to receive the data broadcast signals, terrestrial broadcast signals, and input signals of Composite/S-Video/Component/RGB/HDMI/DVI/IEEE1394.

However, if a conventional broadcast specification is applied to the broadcast receiver including an internal or external set-top box capable of receiving the data broadcast signals, the following problems occur.

Firstly, the conventional data broadcast specification has been designed to control all functions of the broadcast receiver (e.g., a DTV, etc.) by applications related to data broadcasting (hereinafter referred to as "data broadcasting-associated application"). In fact, it is almost impossible for the data broadcast specification to define a function capable of being newly added to the broadcast receiver itself or a function for receiving audio/video (A/V) data from an external device, and processing the A/V data.

Secondly, the conventional data broadcast specifications have been designed to control all functions of the broadcast receiver by the data broadcasting-associated application, such that a Native application for processing signals other than cable broadcast signals unavoidably conflicts with the above-mentioned data broadcast-associated application on the condition that the Native application and the data broadcast-associated application control the same system.

SUMMARY OF THE INVENTION

Accordingly, the present invention is directed to a method for managing the applications related to data broadcasting, a class/interface structure for controlling the same, and a broadcasting receiver for controlling the class/interface receiver, that substantially obviate one or more problems due to limitations and disadvantages of the related art.

An object of the present invention is to provide a method for managing the applications related to data broadcasting, a class/interface structure for controlling the same, and a broadcasting receiver for controlling the class/interface receiver, which can implement a new function even when a broadcast receiver's function having no connection with the data broadcast signals is added to a system at any time.

Another object of the present invention is to provide a method for managing the applications related to data broadcasting, a class/interface structure for controlling the same, and a broadcasting receiver for controlling the class/interface receiver, which can prevent data broadcast-associated application from conflicting with a Native application on the condition that the Native application and the data broadcast-associated application control the same function.

Yet another object of the present invention is to provide a method for managing the applications related to data broadcasting, a class/interface structure for controlling the same, and a broadcasting receiver for controlling the class/interface receiver, which can implement a specific function by a specific application on the condition that data broadcast-associated applications conflict with a Native application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method comprising the steps of: pausing an application associated with a cable mode if a current input mode is not in cable mode; and controlling a broadcast receiver by using an application that is native to the broadcast receiver.

In another aspect of the present invention, there is provided a processor executable medium having instructions contained therein, which when executed by the processor causes the processor to perform the method.

In yet another aspect of the present invention, there is provided a method comprising the steps of: deleting an application associated with a cable mode if a current input mode is not in cable mode; and controlling a broadcast receiver using an application native to the broadcast receiver.

In yet another aspect of the present invention, there is provided a processor executable medium having instructions contained therein, which when executed by the processor causes the processor to perform the method.

In yet another aspect of the present invention, there is provided a broadcast receiver comprising: a controller configured to pause an application associated with a cable mode if a current input mode is not in cable mode; and the controller further configured to control the broadcast receiver using an application native to the broadcast receiver.

In yet another aspect of the present invention, there is provided a broadcast receiver comprising: a controller configured to delete an application associated with a cable mode if an input mode is not in cable mode; and the controller further configured to control the broadcast receiver using an application native to the broadcast receiver.

In yet another aspect of the present invention, there is provided a method comprising the steps of: pausing an application associated with a data broadcasting mode if an input mode is not in a data broadcasting mode; and controlling a broadcast receiver using an application native to the broadcast receiver.

In yet another aspect of the present invention, there is provided a broadcast receiver comprising: a controller configured to pause an application associated with a data broadcasting mode if an input mode is not in a data broadcasting mode; and the controller further configured to control a broadcast receiver using an application native to the broadcast receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that the present invention can properly cope with a specific condition that a broadcast receiver's function having no connection with data broadcast signals is added to a system at any time, and can prevent data broadcast-associated application from conflicting with a Native application on the condition that the Native application and the data broadcast-associated application control the same function.

For a brief description of the present invention, the present invention is classified into a first preferred embodiment, a second preferred embodiment, a third preferred embodiment, a fourth preferred embodiment, a fifth preferred embodiment, a sixth preferred embodiment, and a seventh preferred embodiment.

The first preferred embodiment describes a first method which can solve a conflict between the data broadcast-associated application and the Native application in a mode other than a data broadcast input mode.

The second preferred embodiment describes a second method which can solve a conflict between the data broadcast-associated application and the Native application in a mode other than a data broadcast input mode.

The third preferred embodiment describes a third method which can solve a conflict between the data broadcast-associated application and the Native application in a mode other than a data broadcast input mode.

The fourth preferred embodiment describes a fourth method which can solve a conflict between the data broadcast-associated application and the Native application in a mode other than a data broadcast input mode.

The fifth preferred embodiment describes a fifth method which can solve a conflict between the data broadcast-associated application and the Native application in a mode other than a data broadcast input mode.

The sixth preferred embodiment describes a time-dependent control method for a broadcast receiver.

The seventh preferred embodiment describes a broadcast receiver according to the present invention.

Prior to describing the first to seventh preferred embodiments, terms for the description of the present invention will be described.

Figure 1:
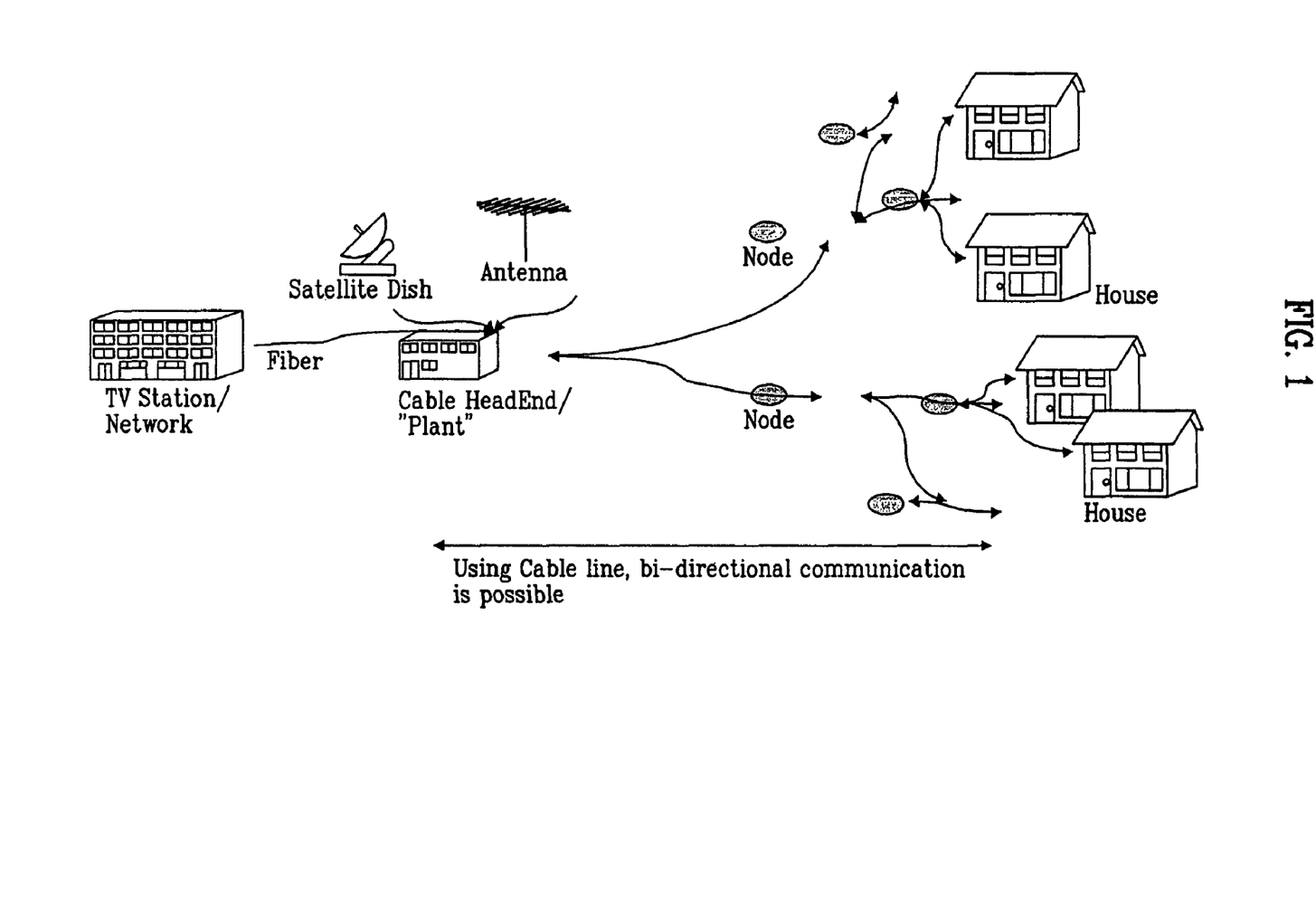
FIG. 1 is a conceptional diagram of a cable broadcast network including a host and a cable card.

FIG. 1 is a conceptional diagram of a cable broadcast network including a host and a cable card.

Figure 2:
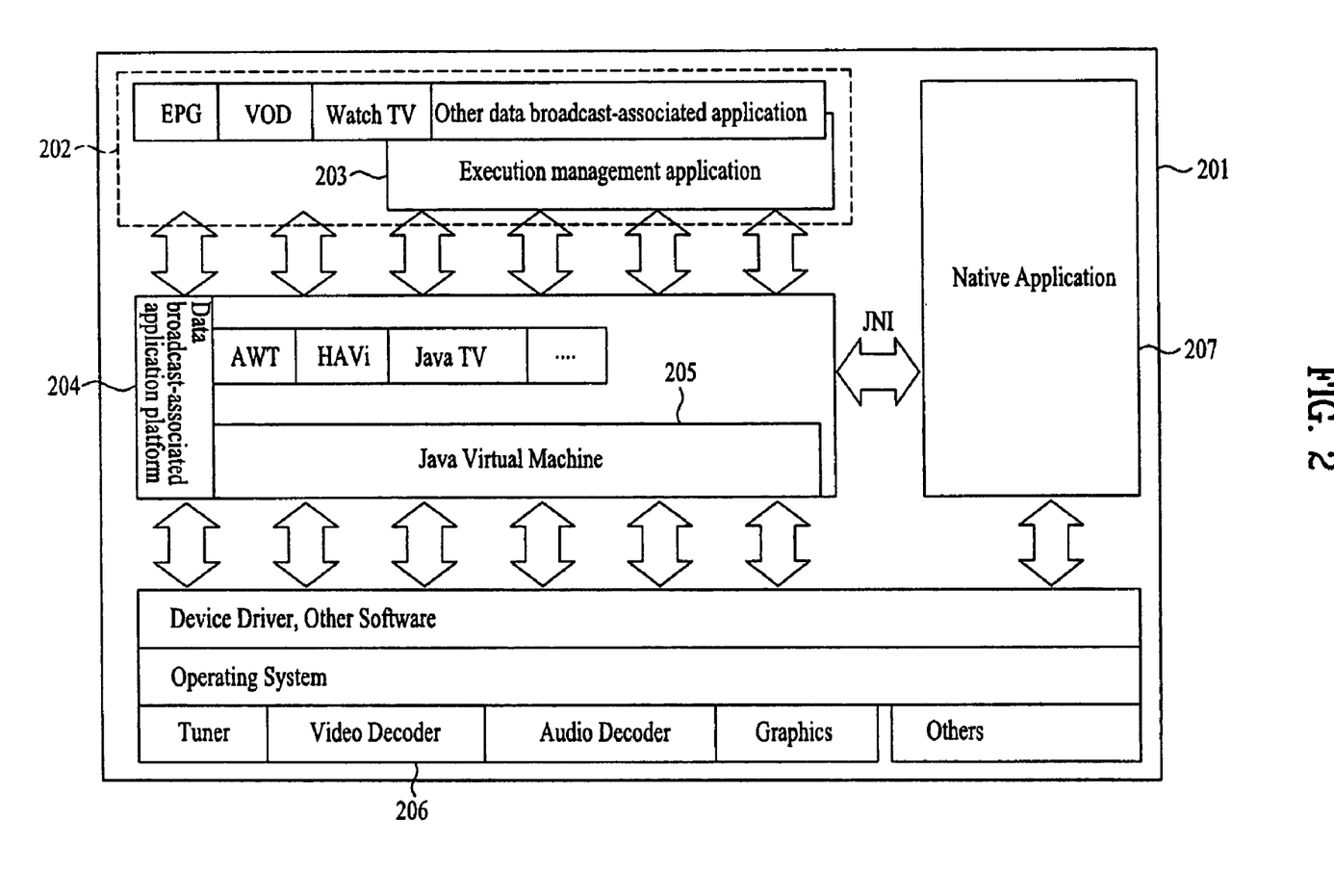
FIG. 2 is a structural diagram illustrating a relationship between software and hardware units of a broadcast receiver equipped with a data broadcast-associated application platform.

FIG. 2 is a structural diagram illustrating a relationship between software and hardware units of a broadcast receiver equipped with a data broadcast-associated application platform.

Figure 3:
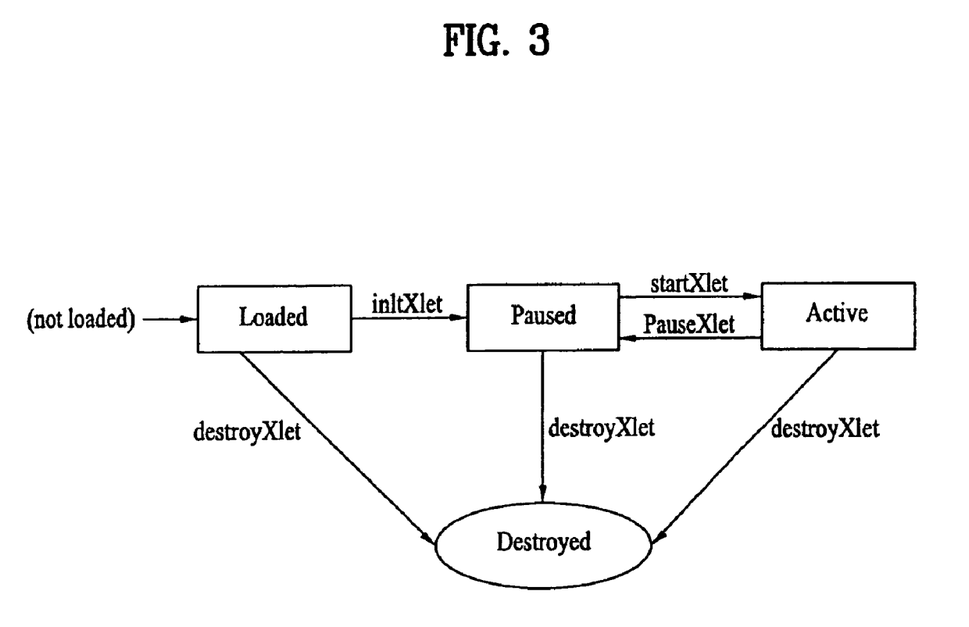
FIG. 3 exemplarily shows a life cycle of a Java program (Xlet)

FIG. 3 exemplarily shows a life cycle of a Java program (Xlet).

Referring to FIG. 1, a cable headend or plant can receive broadcast signals via various communication networks from a television broadcasting station. The television broadcasting station has at least one server which includes various information related to the present invention such as a descriptor and data. The cable headend delivers a cable broadcast to a cable broadcast receiver via a network including nodes.

A host and a cablecard can tranmit/receive signals to/from the cable headend. In this case, the corresponding transmission is achieved via a cable network capable of transferring data bi-directionally.

The host can be connected to various interfaces including a digital television, a DVD player, a digicam, a set-top box and the like.

Referring to FIG. 2, the broadcast receiver 201 (e.g., a digital TV (DTV), etc.) equipped with a data broadcast-associated application platform includes a data broadcast-associated application 202, a data broadcast-associated application platform 204, a Native application 207, and a hardware unit 206 for operating the above-mentioned applications, etc.

However, the above-mentioned data broadcast-associated application platform 204 may exemplarily correspond to an Open Cable Application Platform (OCAP), etc. The above-mentioned data broadcast-associated application may exemplarily correspond to the OCAP application.

Although the present invention can be applied to all of data broadcast-associated applications, it is assumed that a representative example of the present invention is the OCAP application for the convenience of description and better understanding of the present invention, and the above-mentioned assumption will be understood by those skilled in the art.

The hardware unit 206 has been previously established by a TV manufacturer, etc. The hardware unit 206 includes a tuner, a video decoder, an audio decoder, and a graphics unit (e.g., an On Screen Display (OSD)). Furthermore, the operating system is contained in the hardware unit 206.

A Device Driver for operating the hardware unit 206, Other Software part, and a data broadcast-associated application platform 204 are contained in the above-mentioned operating system. In addition, the above-mentioned Native application 207 is mounted to the operating system.

The above-mentioned data broadcast-associated application platform 204 includes a Java virtual machine 205 for executing a Java program. A variety of software modules (e.g., AWT, HAVi, and JavaTV, etc.) are placed on the data broadcast-associated application platform 204.

In the meantime, the data broadcast-associated application 202 downloaded from a broadcasting station to the broadcast receiver 201 may exemplarily correspond to the OCAP application. The OCAP application is operated on the Java virtual machine 205, and controls the hardware unit 206 (e.g., the tuner, and the video decoder, etc.).

In other words, the function of the data broadcast-associated application 202 is limited by a class library (e.g., AWT, and HAVi, etc.) of the above-mentioned data broadcast-associated application platform 204. In fact, most hardware units of the broadcast receiver 201 can be controlled by the class library.

For example, the class library may correspond to a Java class package, etc.

In the meantime, the above-mentioned data broadcast-associated application 202 may include an execution management application 203, an EPG, a VOD, and a Watch TV, etc.

In this case, the above-mentioned execution management application 203 is an initially-executed application for the broadcast receiver, and serves as a manager of the data broadcast-associated application 202 capable of executing/deleting other data broadcast-associated applications. In other words, the above-mentioned execution management application 203 is the principal program including a policy of a data broadcast enterprise.

For example, the execution management application 203 may correspond to the monitor application, etc.

The EPG may include not only a TV guide function but also characteristics of a Watch TV program capable of executing the principal functions (e.g., channel Up/Down functions, etc.) of the broadcast receiver. Furthermore, a Pay-Per-View service may be executed by the above-mentioned EPG.

The Watch TV is indicative of a program capable of executing basic operations for allowing a user to view TV programs.

The VOD (Video-On-Demand) performs a general VOD function. For example, the VOD executes a RVOD (Real VOD) and a Near VOD (NVOD), etc. If a hardware disc exists, the VOD may be implemented with the hard disc.

The Native application 207 is not a program transmitted/downloaded by a broadcast station as in the data broadcast-associated application 202, but a specific program for executing basic functions of the broadcast receiver 201. The Native application 207 is indicative of a basic program established by a manufacturer of the broadcast receiver 201.

In the meantime, the Native application 207 may communicate with the data broadcast-associated application platform 204 and the data broadcast-associated application 202.

For example, the Native application 207 may communicate with the data broadcast-associated application platform 204 and the data broadcast-associated application 202 using a Java Native Interface (JNI).

The JNI is an interface required when a program written by Java language uses a software program written in C or C++ language, or a software program written in C or C++ language uses a software program written in Java language. The JNI is supported by the Java virtual machine 205.

In the meantime, as shown in FIG. 3, the downloaded Java application has the following life cycle. However, it is assumed that the term "Xlet" is indicative of the downloaded Java application.

The Java application "Xlet" is downloaded, is loaded in a memory, and is initialized. The Xlet is initialized, such that it enters a pause state. Thereafter, the Xlet starts operation by the Xlet itself or another Xlet, such that it enters an active state. The Xlet may pause or be destroyed by the Xlet itself or another Xlet.

In this case, in order to command another Xlet to pause or destroy a specific Xlet, the another Xlet must call a pause or stop function using "org.dvb.application.AppProxy object".

The above-mentioned "AppProxy" determines whether the calling application has an authority to pause, destroy, or stop a corresponding application. If it is determined that the AppProxy has no authority, an unexpected error occurs.

In this case, the AppProxy is not an application transmitted/downloaded via a cable broadcasting service provider, but from some parts of the OCAP library. The AppProxy is a software program pre-stored in a TV by a TV manufacturing company.

First Preferred Embodiment

FIG. 2 is a structural diagram illustrating a relationship between software and hardware units of a broadcast receiver equipped with a data broadcast-associated application platform.

FIG. 3 exemplarily shows a life cycle of a Java program (Xlet).

Referring to FIGS. 2 and 3, a first method for solving a conflict between the data broadcast-associated application and the Native application in a mode other than a data broadcast input mode will hereinafter be described.

For the convenience of description and better understanding of the present invention, it is assumed that the data broadcast-associated application is the OCAP application in not only the following first preferred embodiment but also other preferred embodiments.

For example, the data broadcast-associated application can be an application associated with a cable mode (the cable mode associated application). The cable mode associated application is transmitted to a broadcast receiver by a cable broadcasting station. The above-mentioned fact is obvious to those skilled in the art in light of the appended claims and their equivalents.

Therefore, the present invention is not limited to the OCAP data broadcast specification, and can also be applied to other data broadcast specifications. The above-mentioned fact is obvious to those skilled in the art in light of the appended claims and their equivalents.

For example, the present invention can also be applied to a cable broadcast service, a terrestrial broadcast service, and a satellite broadcast service.

In association with the present invention, the simplest method is a method for destroying all of data broadcast-associated applications 202 including the execution management application 203 in a mode (e.g., a terrestrial broadcast mode, a Video 1 mode, and a Video 2 mode, etc.) different from the data broadcast input mode.

The first to seventh preferred embodiments of the present invention will exemplarily describe a specific situation that broadcast data is received via the cable broadcast service.

For example, a priority of the execution management application 203 is set to a value not equal to the highest value, such that the first preferred embodiment will be implemented. In association with the above-mentioned priority, if values from 0 to 255 are established, there is a need to adjust the priority of the execution management application 203, such that the execution management application 203 has a specific value among values of 0~254.

Second Preferred Embodiment

FIG. 2 is a structural diagram illustrating a relationship between software and hardware units of a broadcast receiver equipped with a data broadcast-associated application platform.

FIG. 3 exemplarily shows a life cycle of a Java program (Xlet).

Referring to FIGS. 2 and 3, a second method for solving a conflict between the data broadcast-associated application and the Native application in a mode other than a data broadcast input mode will hereinafter be described.

Compared with the first preferred embodiment, the second preferred embodiment does not destroy the data broadcast-associated application including the execution management application, whereas the first preferred embodiment destroys the data broadcast-associated application including the execution management application when a current mode is not a data broadcast input mode.

For example, the second preferred embodiment controls the OSD layer, on which the data broadcast-associated application is displayed, to disappear from the screen. And, the second preferred embodiment controls the data broadcast-associated application not to receive any user input data.

In this case, all the data broadcast-associated applications 202 are not in the pause state, and are substantially in an operation state. However, the second preferred embodiment does not display any GUI (Graphic User Interface) related to the data broadcast-associated application 202 on the screen, and receives no user input data. In fact, it is expected that the data broadcast-associated application 202 is in a paused state.

The second preferred embodiment does not delete the data broadcast-associated application 202, such that a response action of the broadcast receiver 201 is greatly increased.

Third Preferred Embodiment

FIG. 2 is a structural diagram illustrating a relationship between software and hardware units of a broadcast receiver equipped with a data broadcast-associated application platform.

FIG. 3 exemplarily shows a life cycle of a Java program (Xlet).

Referring to FIGS. 2 and 3, a third method for solving a conflict between the data broadcast-associated application and the Native application in a mode other than a data broadcast input mode will hereinafter be described.

In the case of the second preferred embodiment, if an input mode of the broadcast receiver is not the cable broadcast mode, the data broadcast-associated application can substantially maintain a pause state.

However, the data broadcast-associated application can execute a specific operation irrespective of user input data. In this case, unexpected problems occur.

For example, in order to allow the data broadcast-associated application 202 to execute a specific operation, the data broadcast-associated application 202 receives an application information table (e.g., eXtended Application Information Table (XAIT) or Application Information. Table (AIT), etc.), and employs an internal timer, an event generation, or an infinite loop, etc. In more detail, the data broadcast-associated application 202 may establish a new tuner, may modify a video PID of the video decoder, or may change the screen size.

In this case, the above-mentioned application information table is a table for providing the broadcast receiver with a variety of application information, for example, an application name, an application version, an application priority, an application ID, an application state, and an application type information, etc.

If the data broadcast-associated applications 202 arbitrarily perform the above-mentioned operations on the condition that the user does not view broadcast data, the user may regard the above-mentioned situation as a failure of the broadcast receiver 201, such that the above-mentioned second preferred embodiment requires more fundamental solutions. Therefore, there is proposed a third preferred embodiment.

Therefore, the Native application 207 is designed to pause or destroy the data broadcast-associated application 202 including the execution management application 203 as necessary. In this case, the broadcast receiver 201 may include all the cases excepting the cable broadcast input mode.

In more detail, the broadcast receiver 201 may design the Native application 207, such that only the Native application 207 can call pause- and start-commands associated with the execution management application 203.

For example, if the execution management application 203 is in the pause state, all the applications executed by the execution management application 203 itself are paused or destroyed.

If the execution management application 203 is not destroyed, the Native application 207 destroys all the applications executed by the Native application 207 itself.

In the meantime, if the above-mentioned Native application 207 restarts the execution management application 203 of the paused or destroyed state, the execution management application 203 restarts all of applications associated with the paused or destroyed state.

Fourth Preferred Embodiment

FIG. 2 is a structural diagram illustrating a relationship between software and hardware units of a broadcast receiver equipped with a data broadcast-associated application platform.

FIG. 3 exemplarily shows a life cycle of a Java program (Xlet).

Referring to FIGS. 2 and 3, a fourth method for solving a conflict between the data broadcast-associated application and the Native application in a mode other than a data broadcast input mode will hereinafter be described.

The above-mentioned third preferred embodiment must unavoidably modify the standard indicating that the execution management application and the data broadcast-associated application have the highest priority. In order not to modify the above-mentioned specification, there is newly proposed a fourth preferred embodiment.

Compared with the third preferred embodiment, the Native application 207 of the fourth preferred embodiment determines whether a current input mode of the broadcast receiver 201 is a cable broadcast mode or not, and informs the execution management application 203 of the determined result, whereas the Native application 207 of the third preferred embodiment directly commands the data broadcast-associated applications 202 to be pause or destroyed.

In order to implement the above-mentioned fourth preferred embodiment, the execution management application 203 may use a Method, such that it determines whether the input mode of the broadcast receiver 201 is a cable broadcast mode using the Method, and informs other applications of the determined result.

For example, the above-mentioned Method may be defined as follows:

[Method]

void NotifyEnvironment(BOOLEAN is Cable)

The above-mentioned Method is indicative of a method for employing an object in an Object-Oriented programming method, and the set of the Methods may be defined as an Interface.

For example, a member function of the Java class must be defined when a predetermined Java class is defined. In this case, the member function is referred to as the "Method".

The Method may be added to the definition of the Java class as a member function. Otherwise, the Method may define a new Java class by inheriting the new Java class from a conventional Java class, and may be added to the definition of the new Java class as a member function.

For the above-mentioned class, an additional interface is defined, such that the Method may be contained in some parts of the interface. Otherwise, the above-mentioned method may also be defined by inheriting a new interface from a conventional interface.

In the meantime, if "is Cable" has a specific value (FALSE), the execution management application 203 allows its execution application to pause (i.e., a paused state). The execution management application 203 allows some applications to be destroyed (i.e., a destroyed state) as necessary. Thereafter, the execution management application 203 is also changed to the paused state.

Although the above-mentioned applications changed to the paused state exist in a memory, there is no operation of the above-mentioned applications.

However, if a current state is changed to a start state, the above-mentioned applications can be immediately operated without an additional launching process. In this case, all user input data is transmitted to the Native application 207, and is not transmitted to the data broadcast-associated application 202.

In the meantime, if "is Cable" has another value (TRUE), the execution management application 203 changes its current state to an active state, and restarts all applications executed by the execution management application 203 itself. If required, the execution management application 203 may newly launch some applications (i.e., destroyed applications).

After the execution management application 203 recognizes that a current broadcast receiver 201 is in a cable broadcast mode, most user input data is applied to the data broadcast-associated application 202, such that the data broadcast-associated application 202 processes the received user input data.

Fifth Preferred Embodiment

FIG. 2 is a structural diagram illustrating a relationship between software and hardware units of a broadcast receiver equipped with a data broadcast-associated application platform.

FIG. 3 exemplarily shows a life cycle of a Java program (Xlet).

Referring to FIGS. 2 and 3, a fifth method for solving a conflict between the data broadcast-associated application and the Native application in a mode other than a data broadcast input mode will hereinafter be described.

It is assumed that broadcast data is received via a cable broadcast mode. Needless to say, it should be noted that the present invention can also be applied to broadcast data received via a terrestrial broadcast mode or a satellite broadcast mode.

The following fifth preferred embodiment adds a new Method indicating detailed information of an input mode of a current broadcast receiver 201, whereas the above-mentioned fourth preferred embodiment has added the Method indicating whether the current broadcast receiver is in a cable broadcast mode.

In other words, the Method of the fourth preferred embodiment has indicated whether the current broadcast receiver 101 is a cable broadcast mode or not, but the new Method of the fifth preferred embodiment correctly indicates category information of the selected input mode.

In this case, a new Method is added to the above-mentioned execution management application 203, an interface capable of querying both the number of system's usable inputs and category information of the above-mentioned usable inputs is added to the data broadcast-associated application platform 204, and the data broadcast-associated application 202 can recognize the cable broadcast mode and other input modes.

Therefore, the execution management application 203 receives specific information indicating whether the changed input mode is the cable broadcast mode or not, can perform the above-mentioned pause/restart operations according to the received information, and can further perform additional operations according to categories of the changed input mode.

Sixth Preferred Embodiment

Figure 4:
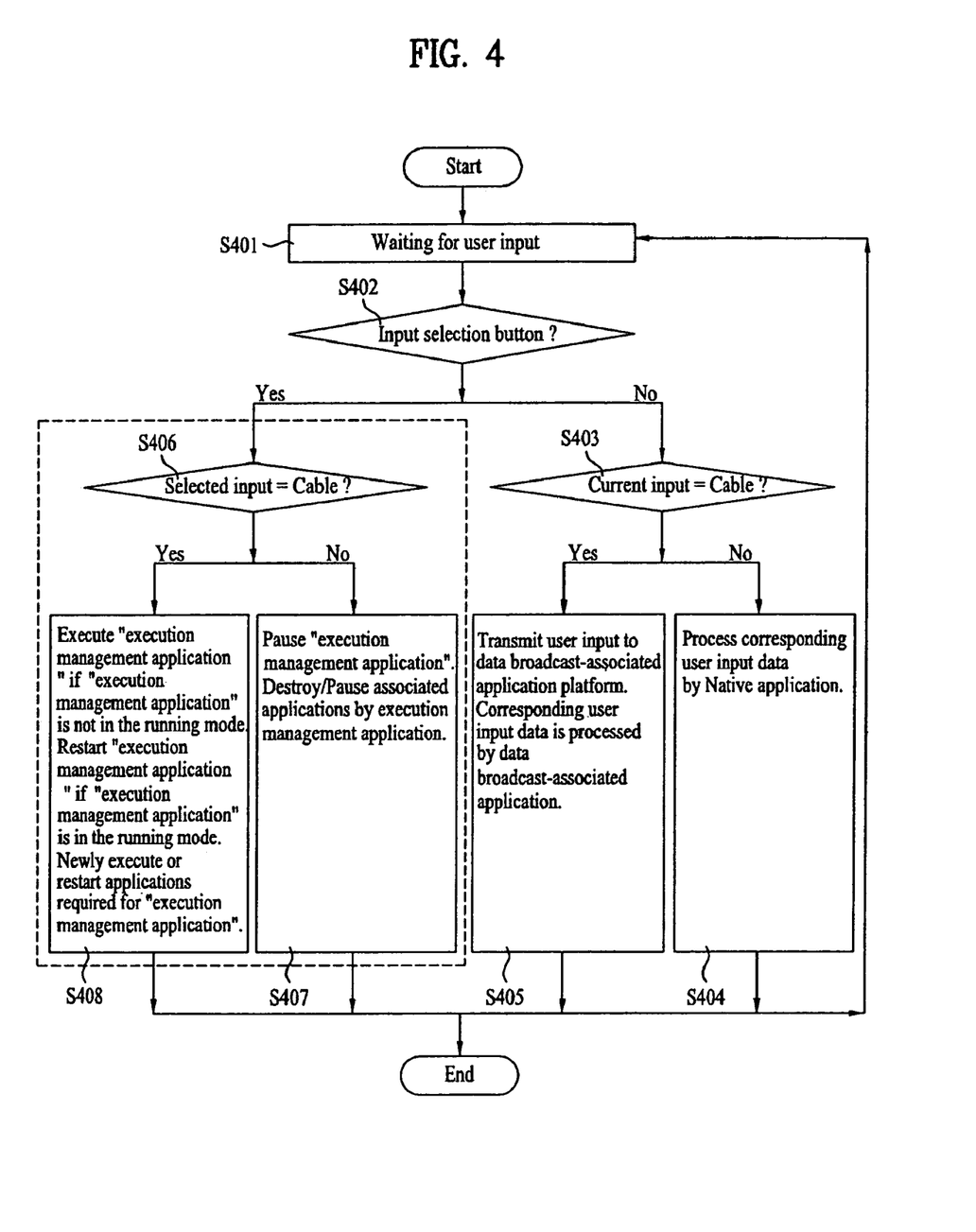
FIG. 4 is a flow chart illustrating a method for limiting a data broadcast-associated application during the data broadcasting according to the present invention.

FIG. 4 is a flow chart illustrating a method for limiting a data broadcast-associated application during the data broadcasting according to the present invention.

Figure 5:
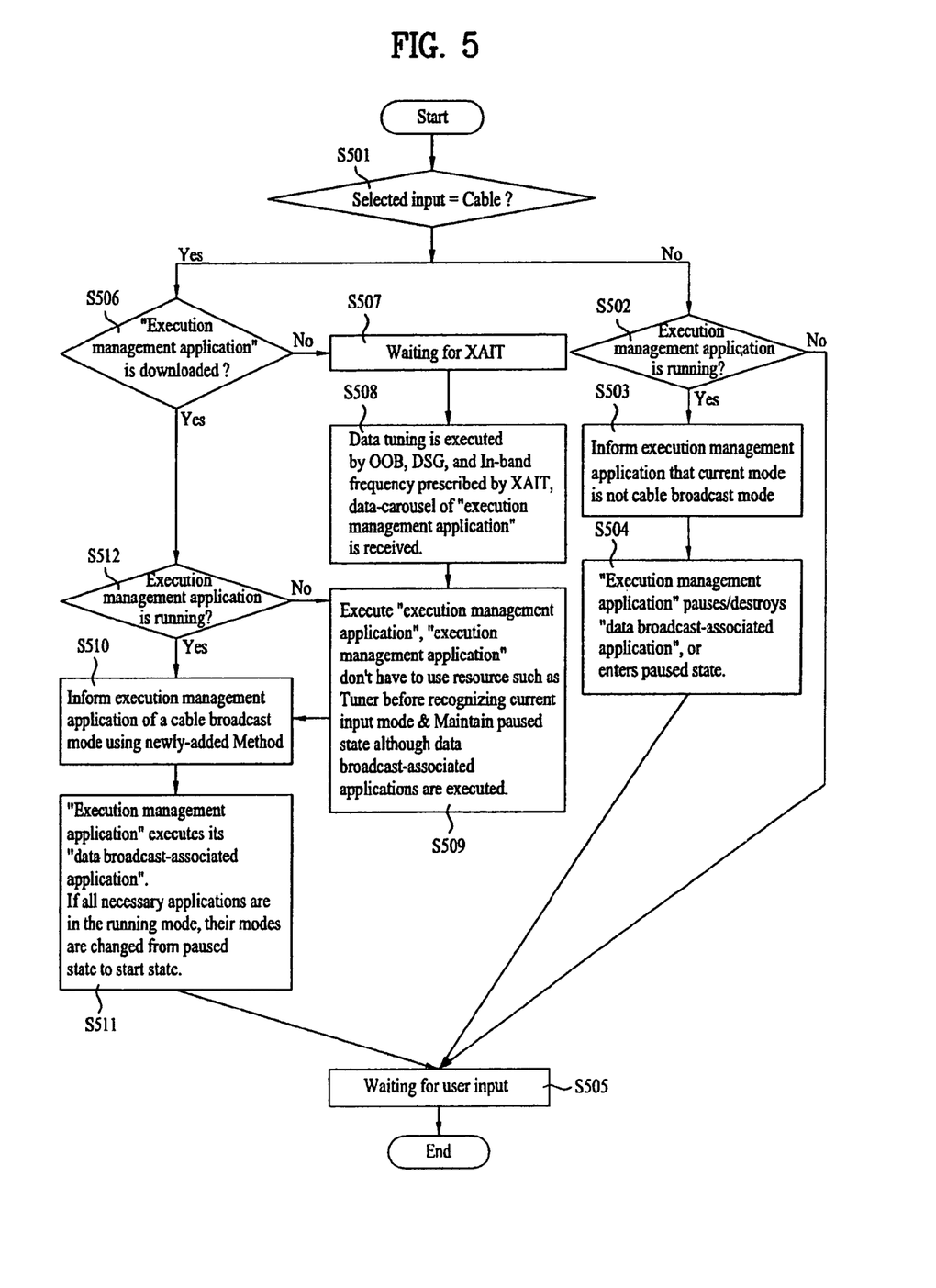
FIG. 5 is a flow chart illustrating a method for limiting a data broadcast-associated application during the data broadcasting according to the present invention.

FIG. 5 is a flow chart illustrating a method for limiting a data broadcast-associated application during the data broadcasting according to the present invention.

A time-dependent control method for a broadcast receiver according to the present invention will hereinafter be described with reference to FIGS. 4 and 5.

It is assumed that broadcast data is received via a cable broadcast mode. Needless to say, it should be noted that the present invention can also be applied to broadcast data received via a terrestrial broadcast mode or a satellite broadcast mode.

The broadcast receiver 201 waits for user input data at step S401. For example, the broadcast receiver 201 is in a first state in which a power-supply plug is connected and a power-supply voltage is applied to the broadcast receiver 201, or is in a second state in which a power-supply plug is connected and a standby mode is established.

The controller determines whether a specific input mode is selected by an input mode selection button at step S302. For example, the above-mentioned selection button may be indicative of a local key button attached to the broadcast receiver 101 or a button of a remote-controller.

For example, the controller may be indicative of a Central Processing Unit (CPU) or a microprocessor (MICOM).

The above-mentioned input mode may be indicative of a cable broadcast mode, a terrestrial broadcast mode, a Video-1 mode, and a Video-2 mode, etc.

If the specific input mode is not selected at step S402, the CPU determines whether the input mode of the current broadcast receiver 201 is equal to the cable broadcast mode at step S403.

If the input mode of the current broadcast receiver 201 is not equal to the cable broadcast mode at step S403, the Native application 207 is operated by a control signal of the CPU, such that it processes a corresponding user input signal at step S404.

Otherwise, if the input mode of the current broadcast receiver 201 is equal to the cable broadcast mode at step S403, the user input signal is applied to the data broadcast-associated application platform 204 according to a control signal of the CPU, and the corresponding user input signal is processed by the data broadcast-associated application 202 at step S405.

In the meantime, if the specific input mode is selected at step S402, the CPU determines whether the selected specific input mode is the cable broadcast mode at step S406.

If the selected specific input mode is not equal to the cable broadcast mode at step S406, the execution management application 203 enters the paused state according to a control signal of the CPU. The execution management application 203 allows the corresponding data broadcast-associated applications 202 to enter the paused or destroyed state at step S407.

Otherwise, if the selected specific input mode is equal to the cable broadcast mode at step S406, the CPU determines whether the execution management application 203 is currently in a running mode. If the execution management application 203 is not in the running mode, the CPU executes the execution management application 203.

However, if the execution management application 203 is in the running mode, the CPU restarts the execution management application 203. The restarted execution management application 203 newly executes or restarts data broadcast-associated applications 202 required for a service at step S408.

A detailed description of the above steps S406, S407, and S408 will hereinafter be described with reference to FIG. 5.

In other words, FIG. 5 is a flow chart illustrating detailed operations of the above steps S406, S407, and S408 shown in FIG. 4.

Firstly, it is assumed that a specific input mode is selected.

If the specific input mode is selected, the CPU determines whether the selected specific input mode is equal to the cable broadcast mode at step S501.

If the selected specific input mode is not equal to the cable broadcast mode at step S501, the CPU determines whether the execution management application 203 is currently in a running mode at step S502.

If the execution management application 203 is not in the running mode at step S502, the CPU waits for the next user input data at step S505.

Otherwise, if the execution management application 203 is in the running mode at step S502, the CPU informs the execution management application 203 that the broadcast receiver 201 is not in the cable broadcast mode at step S503.

The execution management application 203 allows the corresponding data broadcast-associated applications 202 to enter the paused or destroyed state. Thereafter, the execution management application 203 also enters the paused state at step S504.

In the meantime, if the selected specific input mode is the cable broadcast mode at step S501, the CPU determines whether the execution management application 203 is downloaded in a memory at step S506.

If the execution management application 203 is not downloaded in the memory at step S506, the CPU waits for extended Application Information Table (XAIT) reception at step S507.

Data tuning is executed by OOB (Out Of Band), DSG (Docsis Settop Gateway), and In-band frequency prescribed by the above-mentioned XAIT, such that data-carousel of the above-mentioned execution management application 203 is received at step S508.

The received execution management application 203 is executed at step S509. However, it should be noted that the execution management application 203 is designed not to use input sources (e.g., a tuner) before the broadcast receiver 201 determines its current input mode. Also, the execution management application 203 is designed to maintain the paused state although other data broadcast-associated applications 202 are executed.

The CPU informs the execution management application 203 that the input mode of the broadcast receiver 201 is the cable broadcast mode using the Method shown in the fourth preferred embodiment at step S510.

The execution management application 203 executes the data broadcast-associated application 202 managed by the execution management application 203 itself at step S511. The execution management application 203 may execute another data broadcast-associated application as necessary. If all necessary applications are in the running mode, their modes are changed from the paused state to the start state.

If the execution management application 203 is downloaded in the memory at step S506, the CPU determines whether the execution management application 203 is in the running mode at step S512.

If the execution management application 203 is not in the running mode at step S512, the CPU goes to step S509.

However, if the execution management application 203 is in the running mode at step S512, the CPU goes to step S510.

Seventh Preferred Embodiment

Figure 6:
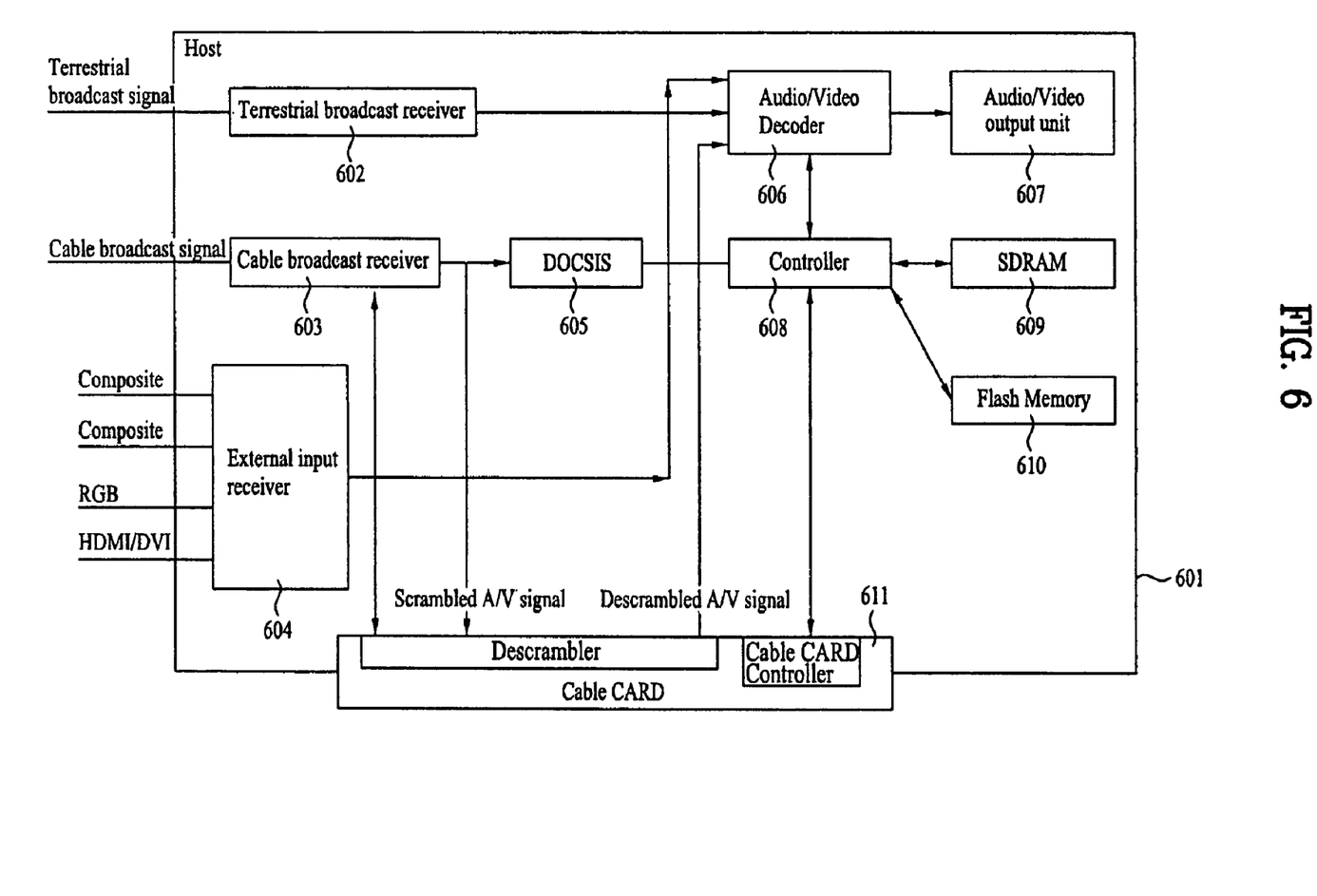
FIG. 6 is a block diagram illustrating a broadcast receiver for limiting the data broadcast-associated application during the data broadcasting according to the present invention.

FIG. 6 is a block diagram illustrating a broadcast receiver for limiting the data broadcast-associated application during the data broadcasting according to the present invention.

A broadcast receiver for managing the data broadcast-associated application during the data broadcasting according to the present invention will hereinafter be described with reference to FIG. 6 and FIGS. 1~5.

The broadcast receiver 601 according to the present invention includes a terrestrial broadcast receiver 602, a cable broadcast receiver 603, an external input receiver 604, a DOCSIS 605, an Audio/Video (A/V) decoder 606, an A/V output unit 607, a controller 608, an SDRAM 609, a flash memory 610, and a cable card 511, etc.

In this case, the broadcast receiver 601 may be a digital TV (DTV) capable of receiving cable broadcast data, or an iDCR (bi-directional Digital Cable Ready) TV.

The most important function of the cable card 611 is to descramble password(s) of scrambled cable broadcast signal(s).

In order to support bi-directional communication (also called two-way communication), the cable broadcast receiver 603 includes an In-band tuner for receiving a Quadrature Amplitude Modulation (QAM) signal and an Out Of Band (OOB) Tuner for receiving a Quadrature Phase Shift Keying (QPSK) signal, and additionally includes a DOCSIS modem, such that it supports the bi-directional communication using the OOB tuner and the DOCSIS modem according to a signal of the cable card 611 and a selection command of the cable broadcast enterprise.

The terrestrial broadcast receiver 602 receives a Vestigial SideBand (VSB) signal, demodulates the received VSB signal, converts the demodulated result into a digital signal, and transmits the digital signal to the A/V decoder 606. However, it should be noted that a video decoder contained in the A/V decoder 606 may be an MPEG video decoder, and an audio decoder contained in the A/V decoder 606 may be an AC3 audio decoder.

The cable broadcast receiver 603 includes two tuners, i.e., an In-band tuner and an OOB tuner. Specifically, the above-mentioned. In-band tuner receives only the QAM signal, and the OOB tuner receives the QPSK or QAM signal.

In this case, the QAM signal received via the In-band tuner includes audio information, video information, or data broadcast information. The audio information and the video information may be scrambled or unscrambled. The QAM signal is applied to the cable card 611 irrespective of its scrambled or unscrambled state, undergoes the descrambling process, and the descrambled result is applied to the A/V decoder 606.

In the meantime, the cable card 611, the controller 608, and the cable headend perform bi-directional communication using the QAM/QPAK signal received via the OOB tuner and the DOCSIS modem.

For example, the controller 608 can be implemented with a microprocessor (MICOM) or a CPU, etc.

A detailed description of the broadcast receiver shown in FIG. 6 will hereinafter be described.

The Native application 207, the data broadcast-associated application platform 204, a driver for controlling hardware units 206 (e.g., a tuner), and other necessary software programs are stored in the flash memory 510. In this case, the flash memory 610 is used as an example, and other memory capable of storing data may also be used as necessary.

If the broadcast receiver 601 is powered on, software programs stored in the flash memory 610 are transferred to the SDRAM 609 according to a control signal of the controller 608, and are executed.

In this case, the SDRAM (Synchronous Dynamic Random Access Memory) 609 is used as an example, and other memory capable of storing data may also be used as necessary.

In the meantime, the cable broadcast enterprise transmits the data broadcast-associated application 202 via the cable broadcast mode, the transmitted data broadcast-associated application 202 is stored in the SDRAM 609, and is then executed.

Needless to say, in order to prevent the same data broadcast-associated application 202 from being downloaded whenever the broadcast receiver 601 is powered on, the data broadcast-associated application 202 may also be stored in the flash memory 610.

As previously stated in FIGS. 1 to 5, the controller 608 determines an input mode of the broadcast receiver 601, and allows applications stored in the flash memory 610 or the SDRAM 609 to enter the paused state, the destroyed state, or the restart state.

The data broadcast-associated application 202, the execution management application 203, and the Native application 207, etc. are stored in the flash memory 610 and the SDRAM 609, etc., such that they are operated according to a control signal of the controller 608.

Detailed operations of the above-mentioned applications 202, 203, and 207 have already been fully described in FIGS. 1~5, such that their detailed descriptions will herein be omitted for the convenience of description.

As apparent from the above description, a method for managing the applications related to data broadcasting, a class/interface structure for controlling the same, and a broadcasting receiver for controlling the class/interface receiver according to the present invention can properly cope with a specific condition that a broadcast receiver's function and a new external input part, that have no connection with data broadcast signals, is added to a system at any time.

The method for managing the applications related to data broadcasting, the class/interface structure for controlling the same, and the broadcasting receiver for controlling the class/interface receiver according to the present invention can prevent data broadcast-associated application from conflicting with a Native application on the condition that the Native application and the data broadcast-associated application control the same function.

The method for managing the applications related to data broadcasting, the class/interface structure for controlling the same, and the broadcasting receiver for controlling the class/interface receiver according to the present invention can implement a specific function by a specific application on the condition that data broadcast-associated applications conflict with a Native application.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It will be appreciated that, in various of the above-disclosed and other features and functions, or alternatives thereof, may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow process or data structure can be implemented as a self-consistent sequence of computerized steps that lead to a desired result. These steps can be defined by and/or in one or more computer instructions stored in a computer-readable medium, or can be encompassed using a signal, or provided as software instructions to a processing device. These steps can be performed by a processor executing the instructions that define the steps. Further, the flow process can be performed by a processor executing one or more appropriate programs, by special purpose hardwre designed to perform the method, or any combination of such hardware, firmware and sofrware elements.

It will be appreciated that various the above-disclosed and other features and functions, or alternatives thereof, may be desirably combined into many other different devices or applications. Also, various presently unforeseen or unanticipated alternatives, modifications, variations or improvements therin may be subsequently made by those skilled in the art, and are also intended to be encompassed by the following claims.

What is claimed is:

1. A method of processing an open cable application platform (OCAP) application in a digital broadcast receiver receiving an OCAP data broadcasting, the method comprising:

determining, by a native application at the digital broadcast receiver whether a current broadcasting mode corresponds to the OCAP data broadcasting, wherein the native application includes pre-defined functions that are pre-stored in a memory of the digital broadcast receiver;

informing, by the native application at the digital broadcast receiver, the OCAP application of information indicating that the current broadcasting mode does not correspond to the OCAP data broadcasting if the current broadcasting mode does not correspond to the OCAP data broadcasting, the step of informing further comprising:

firstly informing, by the native application at the digital broadcast receiver, an execution management application of the information, and    secondly informing, by the execution management application, the OCAP application of the information;

preventing the OCAP application from being displayed in response to an event that the current broadcasting mode does not correspond to the OCAP data broadcasting during the time that the OCAP application is active;

preventing a user input signal from being received at the OCAP application in response to the event that the current broadcasting mode does not correspond to the OCAP data broadcasting during the time that the OCAP application is active; and controlling the digital broadcast receiver based on the native application at the digital broadcast receiver.

2. The method according to claim 1, wherein the OCAP application operates at a broadcast associated application platform and is provided by a cable service provider.

\* \* \* \* \*